(12) United States Patent
Asa

(10) Patent No.: US 6,179,716 B1
(45) Date of Patent: Jan. 30, 2001

(54) ECCENTRIC SHAFT COUPLING

(75) Inventor: Yukihiro Asa, Tokyo (JP)

(73) Assignee: Asa Electronic Industry Co., Ltd., Tokyo (JP)

( * ) Notice: Under 35 U.S.C. 154(b), the term of this patent shall be extended for 0 days.

(21) Appl. No.: 09/176,168

(22) Filed: Oct. 21, 1998

(30) Foreign Application Priority Data

Mar. 2, 1998 (JP) ................................................. 10-066195

(51) Int. Cl.⁷ ....................................................... F16D 3/68
(52) U.S. Cl. .............................. 464/93; 464/95; 464/153
(58) Field of Search ........................... 464/70, 71, 73, 464/76, 85, 92, 93, 102, 95, 110, 15 D, 158, 152, 153, 104, 105, 134, 137

(56) References Cited

U.S. PATENT DOCUMENTS

| | | |
|---|---|---|
| 1,350,011 | 8/1920 | Du Bois . |
| 1,417,432 * | 5/1922 | Walker ................................... 464/73 |
| 1,842,582 * | 1/1932 | Bulley ................................... 496/92 |
| 1,887,081 | 11/1932 | Buettell . |
| 2,109,935 * | 3/1938 | Thomas ................................ 464/152 |
| 2,295,003 * | 9/1942 | Natkins ................................. 464/73 |
| 2,301,660 * | 11/1942 | Ricefield ............................... 464/73 |
| 3,438,221 * | 4/1969 | Paulsen ................................. 464/76 |
| 3,830,081 * | 8/1974 | Weber et al. ......................... 464/76 |
| 4,121,438 | 10/1978 | McCullough . |
| 4,191,032 | 3/1980 | August . |
| 4,472,156 * | 9/1984 | Kryscyk ................................ 464/73 |
| 4,838,511 | 6/1989 | Terada et al. . |
| 4,899,608 * | 2/1990 | Knappe et al. ........................ 464/73 |

FOREIGN PATENT DOCUMENTS

| | | |
|---|---|---|
| 27 35 664 | 3/1978 | (DE) . |
| 307 564 | 3/1929 | (GB) . |

OTHER PUBLICATIONS

Patent Abstracts of Japan. vol. 008, No. 238; JP 59–117917, published Jul. 7, 1984 (Kawada Yasuyuki)—(1 Page).

* cited by examiner

*Primary Examiner*—Lynne H. Browne
*Assistant Examiner*—Kenneth Thompson
(74) *Attorney, Agent, or Firm*—Flynn, Thiel, Boutell & Tanis, P.C.

(57) ABSTRACT

The present invention provides an eccentric shaft coupling having a high durability, capable of dealing with a great torque load and transmitting correctly rotational movement. Two pairs of protrusions of cylindrical boss flanges secured to extremities of two rotating shafts are linked through an intermediate disk with phases shifted by 90° from each other. The intermediate disk is made of a material having a satisfactory strength and rigidity. Each of the two pairs of protrusions is put slidably between plane portions of two liners, each having a partial cylindrical shape, whose cross section is enclosed by an arc and a secant, inserted dismountably into a cylindrical cavity along inner walls to be guided. Only the liners, each having a partial cylindrical shape, whose cross section is enclosed by an arc and a secant, are subjected to strong wear and therefore, when they are worn, they can be easily exchanged.

10 Claims, 6 Drawing Sheets

ECCENTRIC SHAFT COUPLING

FIELD OF THE INVENTION

The present invention relates to a shaft coupling transmitting rotating driving force between two shafts, whose centers are slightly deviated from each other, and more concretely to a kind of catch plate couplings, in which two shafts are disposed, adjacent to each other, with phases shifted by 90° from each other so that rotational movement can be continuously transmitted, independently from forward or backward rotation.

DESCRIPTION OF THE PRIOR ART

As a fundamental mechanism of this kind of eccentric shaft couplings there is known an Oldham coupling 100 as indicated by an exploded perspective view in FIG. 9. This coupling 100 is a kind of flexible couplings for coupling two shafts 101 and 102, whose centers are slightly deviated from each other, and in which there is disposed a buffer 103 for removing unnatural power transmission between the two shafts 101 and 102. A boss 108 or 109, in which a groove 106 or 107 is formed, is mounted on an extremity of each of the shafts. Rectangular protrusions 110 and 111 protruding from surfaces of an intermediate disk 112 opposite to each other, which rectangular protrusions are long in directions perpendicular to each other, are engaged with the two bosses 108 and 109, respectively. The two shafts 101 and 102, whose centers are deviated from each other, can be fitted to the rotation transmission owing to the fact that a degree of freedom in the two directions is given to the buffer 103 as described above.

However, since the two shafts 101 and 102 should be kept separate from each other by a distance in order that the intermediate disk 112 can be put therebetween, this kind of couplings can not be used with a device having no spatial margin. Further, particularly in case where the rotational movement should be transmitted continuously, since it gives rise to mutual slide without interruption, the intermediate disk 112 is subjected to significant wear. Therefore, as indicated by an exploded perspective view in FIG. 10, grooves 124 and 125 engaged with protrusions 122 and 123 disposed on bosses 120 and 121, respectively, are formed on two end surfaces of an intermediate disk 126 in an orthogonal relationship and at the same time a through hole 127, in which extremities of the two shafts are accommodated at a central part, is formed so that a small distance between the two shafts can be dealt with. A carbon fiber reinforced plastic material having a good sliding property and a high resistance to wear is used for the intermediate disk 126. In this example, when torque to be transmitted is great, fatigue due to repeated tensile and compressive stress produces cracks C in the intermediate disk 126, which is deformed and finally destroyed, so that transmission of the torque becomes impossible.

SUMMARY OF THE INVENTION

An object of the invention is to provide an eccentric shaft coupling having a high durability and a small size, corresponding to closely disposed shafts, capable of transmitting correctly rotational movement in either of forward and backward directions and transmitting significant torque.

In order to achieve the above object, in an eccentric shaft coupling according to the present invention, cylindrical boss flanges, each of which is secured to each of extremities opposite to each other of two rotating shafts disposed so as to be adjacent to each other in series in a same direction. On a surface of each of these cylindrical boss flanges, which is opposite to a corresponding surface of the other, a pair of protrusions having a same length provided with two parallel surfaces separated by a distance equal for the two protrusions extend along a diametral line from positions opposite to each other in an outer peripheral portion towards a center. The shaft coupling transmitting rotation of one rotating shaft to the other rotating shaft is constructed by coupling these two cylindrical boss flanges through an intermediate disk, in outer peripheral portions of which there are formed two pairs of rectilinear grooves in an orthogonal relationship which are engaged with the protrusions opposite thereto.

These rectilinear grooves formed in the outer peripheral portions of the intermediate disk consist of four cylindrical cavities. These cavities are at a same distance from the center on two diametral lines in an orthogonal relationship, and plane portions of two liners for each of cylindrical cavities, each having a partial cylindrical shape, whose cross section is enclosed by an arc and a secant. The protrusions are inserted into the cylindrical cavities on both the sides opposite to each other along arc-shaped inner walls forming each of the cylindrical cavities. Each of the grooves holds slidably the two parallel surfaces of each of the protrusions.

Further the intermediate disk is made of a metal having a certain rigidity. The liners, each having a partial cylindrical shape, whose cross section is enclosed by an arc and a secant, are made of a material having a high resistance to wear and a good lubricant property. In addition, spacers made of synthetic resin are put between surfaces opposite to each other of each of the cylindrical boss flanges and the intermediate disk in order to prevent that the two surfaces opposite to each other of each of the cylindrical boss flanges and the intermediate disk do not collide directly with each other in contact. Moreover it is preferable that the cylindrical boss flanges are sintered products made by powder metallurgy and that further finished size is decided by high pressure press rectification type sizing.

More preferably the two liners, each having a partial cylindrical shape, whose cross section is enclosed by an arc and a secant, are formed in one body made of a synthetic resin, in which they are linked by a thin plate-shaped portion at one edge of each of them; the length thereof in the axial direction is slightly greater than the length of the intermediate disk in the axial direction; and in addition the thin plate-shaped portion has an elastic and expansible construction, which energizes the two liners, each having a partial cylindrical shape, whose cross section is enclosed by an arc and a secant, so as to increase the distance therebetween.

DESCRIPTION OF THE PREFERRED EMBODIMENTS

Figure 1:
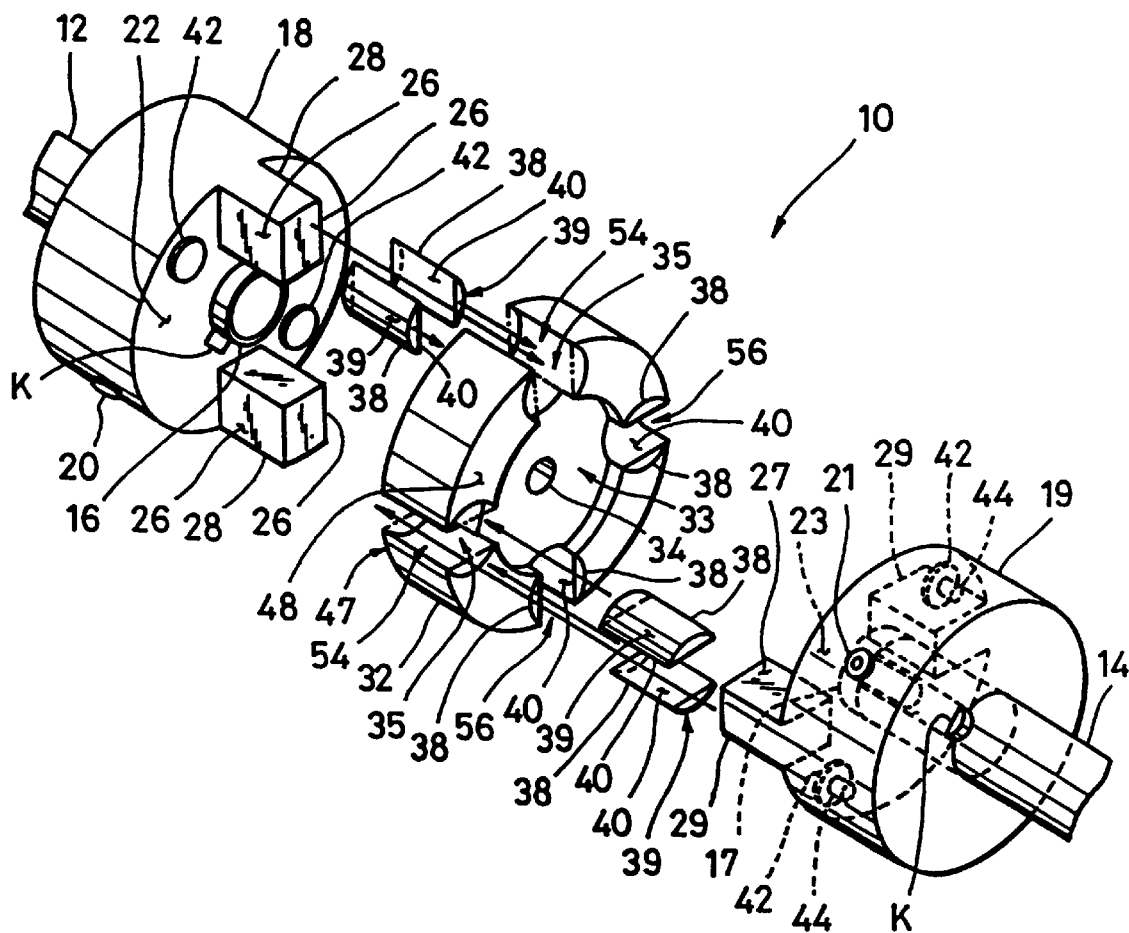
FIG. 1 is an exploded perspective view of an embodiment of the eccentric shaft coupling according to the present invention.

Hereinbelow an embodiment of the eccentric shaft coupling according to the present invention will be explained, referring to the drawings.

Figure 2:
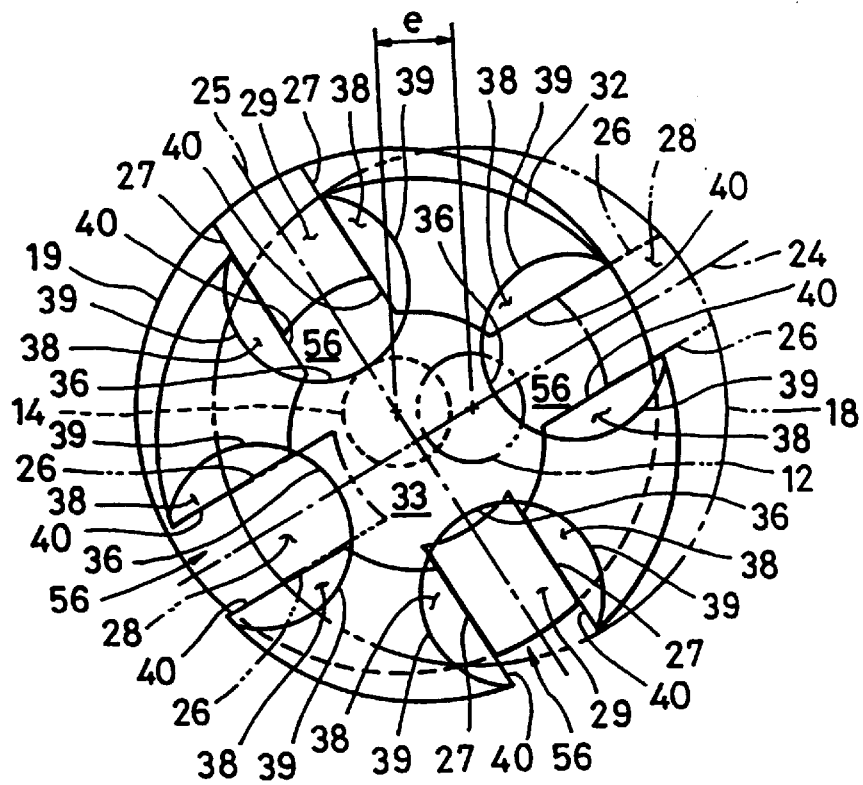
FIG. 2 is a cross-sectional view in a plane perpendicular to the axial direction for explaining a rotation transmitting mechanism of the eccentric shaft coupling according to the present invention.
Figure 3:
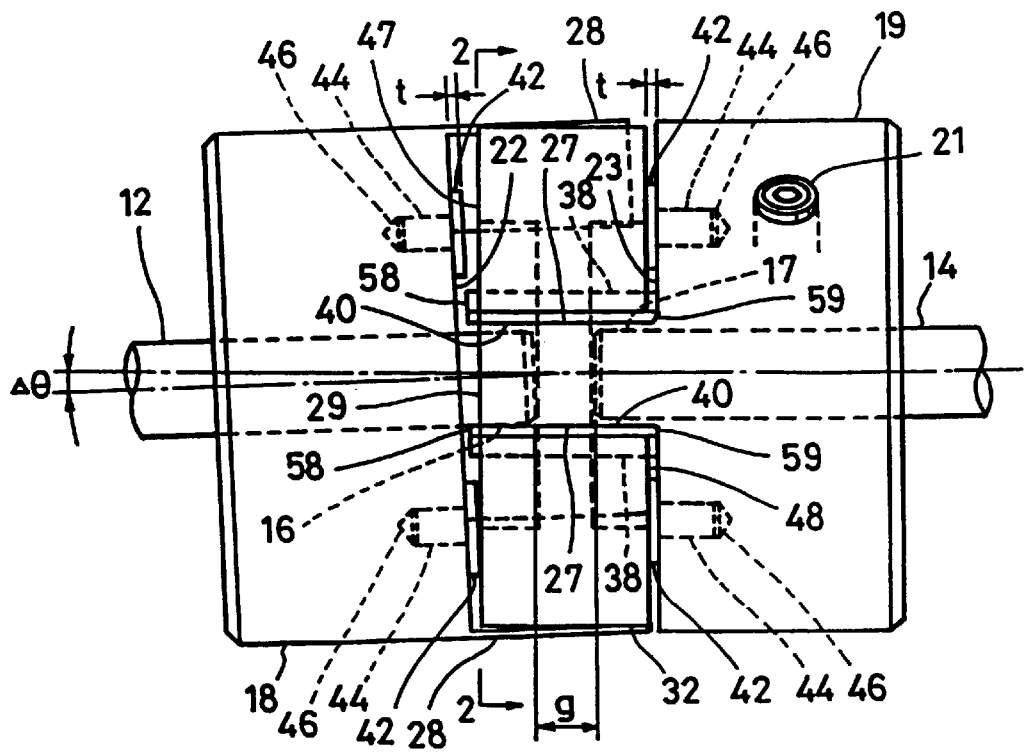
FIG. 3 is a side view for explaining the rotation transmitting mechanism of the eccentric shaft coupling according to the present invention.

FIG. 1 is an exploded perspective view of an embodiment of the eccentric shaft coupling 10 according to the present invention; FIG. 2 is a diagram for explaining a rotation transmitting construction of the eccentric shaft coupling 10 viewed in the axial direction, when there is a deviation e between centers of a first rotating shaft 12 and a second rotating shaft 14 in FIG. 1, which is a cross-sectional view along a line 2—2 in FIG. 3. FIG. 3 is a side view of a mounted coupling for explaining a case where the eccentric shaft coupling 10 indicated in FIG. 1 is applied to shaft lines having an angular deviation Δθ, where the angular deviation Δθ is exaggerated.

Extremities 16 and 17 opposite to each other of the first rotating shaft 12 and the second rotating shaft 14 are inserted into cylindrical boss flanges (hereinbelow called simply boss flanges) 18 and 19, which are secured to the former by means of screws 20 and 21, respectively. A pair of protrusions 28 and 29, each of which is provided with two sliding surfaces 26 or 27 parallel to each other along a diametral line 24 or 25, separated therefrom, with a width w, are formed with a predetermined length d, extending from the outer periphery to the center (refer to FIG. 4A).

The boss flanges 18 and 19 are sintered products fabricated by stainless steel (SUS304) powder metallurgy, which are subjected to precision formation (sizing) compressed by a high pressure, capable of deciding sizes with a high precision. They have a same outer shape apart from a shaft hole 30 worked so as to be fitted with a shaft diameter of each of the rotating shaft 12 or 14 and minor afterwork necessary for mounting them on the rotating shafts 12 and 14 (e.g. key groove K and tap T for setting screws 20, 21). All of the width w between the sliding surfaces 26 or 27 parallel to each other of the protrusion 28 or 29, the length d thereof, and the depth f of engagement of an intermediate disk 32 described later are formed in common to the different boss flanges (refer to FIGS. 4A and 4B).

Figure 5B:
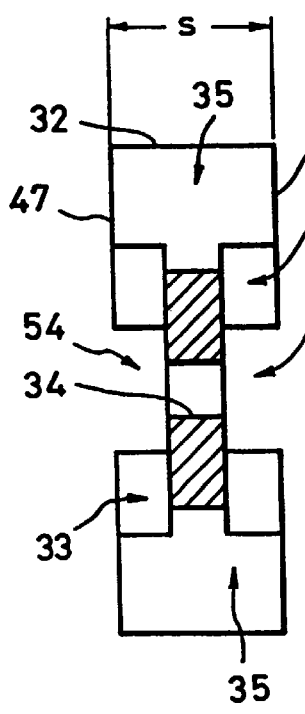
FIG. 5B is a cross-sectional view thereof along a line 5B—5B in FIG. 5A.
Figure 5A:
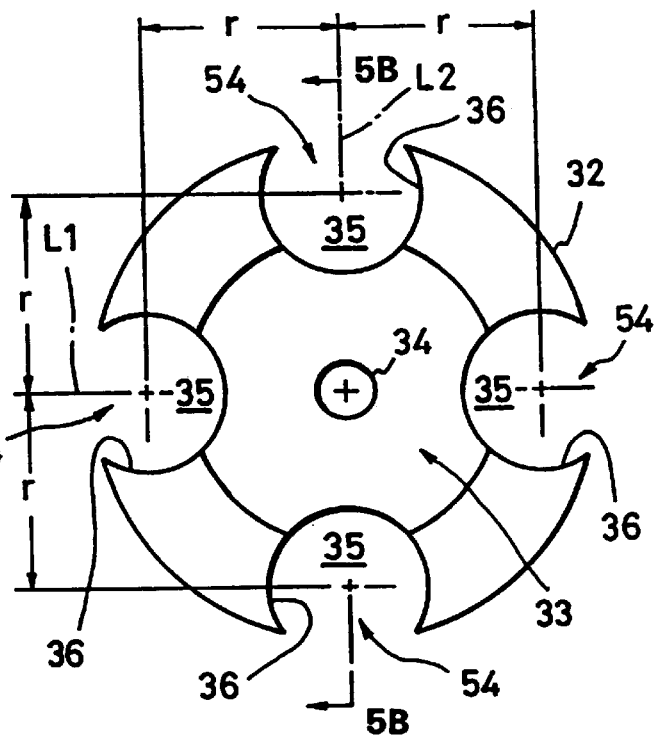
FIG. 5A is a plan view of an intermediate disk in the eccentric shaft coupling according to the present invention.

FIGS. 5A and 5B represent a simple part, which is the intermediate disk 32. FIG. 5A is plan view thereof, while FIG. 5B is a cross-sectional view along a line 5B—5B in FIG. 5A. In the present embodiment the intermediate disk 32 is fabricated by working a circular bar made of light alloy or metal having an appropriate strength. In order to deal with a case where not a sufficient mounting distance g (refer to FIG. 3) between the end surfaces of the rotating shafts 12 and 14, there is disposed a recessed relief space 33 so that the intermediate disk 32 can rotate in a plane without interfering with the rotating shafts 12 and 14. A center hole 34 is made for convenience sake in working and has no functional relation.

As clearly seen from the plan view in FIG. 5A, in the intermediate disk 32 there are formed four cylindrical cavities 35 having centers at a same distance r from the center of the intermediate disk 32 on two diametral lines L1 and L2 perpendicular to each other. Since the cylindrical cavities 35 are through holes, they can be worked simply with a high precision from one side. Into each of the cylindrical cavities, a liner having a partial cylindrical shape, whose cross section is enclosed by an arc and a secant (hereinbelow called simply liner), is inserted. A cylindrical surface of the liner lies in contact with an arc-shaped inner wall 36, which is opposite to another, putting a diametral line L1 or another diametral line L2 therebetween, while plane portions 40 thereof are opposite to each other (refer to FIGS. 1 and 2). The distance between the two plane portions 40 is so determined that it is fitted to the width w between the two parallel sliding surfaces 26 and 27 of the protrusion 28 or 29 of the boss flange without any gap. Consequently it is possible to transmit correctly rotation for either of the forward and the backward direction without any insensitive angular region.

The sliding surfaces 26 and 27 are held by the plane portions 40 of the liners 38 and can slide smoothly thereon by lubrication. Since movement of outer peripheral surfaces of the liners 38 are restricted by the sliding surfaces 26 and 27 as well as the inner wall 36 of the cylindrical cavity and movement of end surfaces thereof in the axial direction is restricted by the surfaces 22 and 23 opposite to each other of the boss flanges, the liners 38 do not fall away from the intermediate disk 32. However, if necessary, they may be stuck to the inner wall 36 of each of the cylindrical cavities.

Figure 6A:
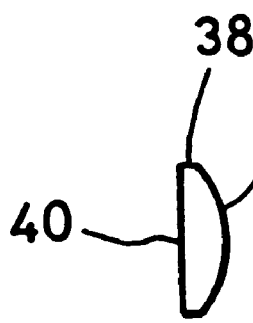
FIG. 6A is a side view of a liner used in the eccentric shaft coupling according to the present invention.
Figure 6B:
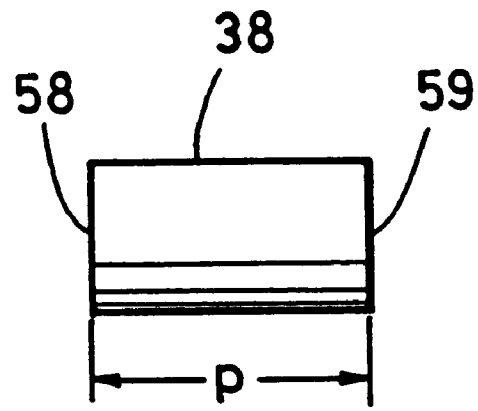
FIG. 6B is a plan view thereof.

FIGS. 6A and 6B show a shape of a liner 38, in which FIG. 6A is a side view, while FIG. 6B is a plan view thereof. The plane portions 40 of the liners 38 and the sliding surfaces 26 and 27 of the boss flanges 18 and 19 produce always mutual sliding, when rotational movement is transmitted continuously. This movement even occurs when a high torque load is transmitted and the plane portions 40 of the liners 38 are subjected to violent friction. For this reason it is possible also that the liners may be made of a material having a high resistance to wear and good sliding characteristics such as a sintered oil-containing alloy, carbon fiber reinforced plastics, etc. so that they can have a long life without oil supply.

Since only the liners are parts subjected to wear due to such sliding friction, only liners that are significantly worn that the function thereof is hindered need be taken out arbitrarily to be exchanged or all the liners 38 can be exchanged periodically. An operation for taking out liners 38 is simple. For example, a set screw 20 of a boss flange is loosened to liquidate linkage thereof with the rotating shaft 12. Then the boss flange 18 is displaced in the axial direction to displace the protrusion 28 by such a distance that it is possible to take out the liners 38 from the intermediate disk 32, i.e. approximately by a width s of the intermediate disk 32. In this way, it can be easily achieved to take out the liners 38 therefrom.

Since the liners have a simple form, it is possible to reserve them as articles of consumption by cutting a long continuously extruded product into pieces of appropriate length. Consequently, in case where the eccentric shaft coupling 10 is used in a production machine, when defects of the intermediate disk 32 should be repaired, since work does not include dismounting of the neighborhood of shaft supporting members for the rotating shafts 12 and 14, the object of the repair being not the whole of the eccentric shaft coupling 10, but it is only exchange of liners, a little time and labor is sufficient therefor and thus it is possible to shorten duration of suspension of the machine and to keep production management smooth.

Figure 4A:
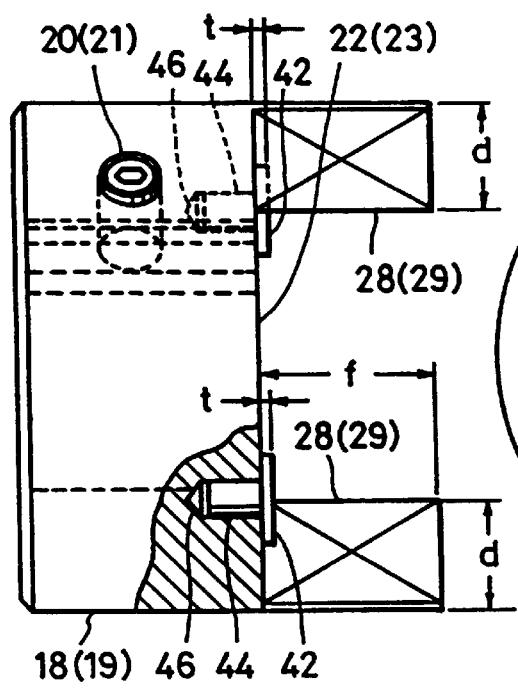
FIG. 4A is a side view, partially a cross-sectional view, of a boss flange in the eccentric shaft coupling according to the present invention.
Figure 4B:
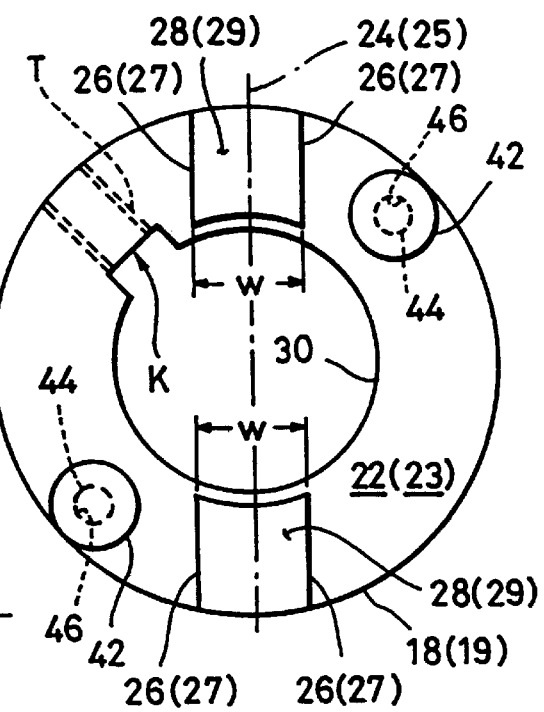
FIG. 4B is a plan view thereof.

Reference numeral 42 in FIGS. 4A and 4B is a disk-shaped spacer (hereinbelow called simply spacer) having a thickness of t provided with a short cylindrical leg portion 44 at the center. Spacer 42 is made of an appropriate synthesized resin. Two spacers 42 are secured to each of the surfaces 22 and 23 of the boss flanges 18 and 19 by inserting leg portions 22 into two drilled holes 46 formed for each thereof with pressure.

Owing to the fact that these spacers 42 are secured to the surfaces 22 and 23 opposite to each other of the boss flanges 18 and 19, the two end surfaces 47 and 48 of the intermediate disk 32 do not collide with the surfaces 22 and 23 opposite to each other of the boss flanges 18 and 19 during rotation between metallic surfaces. This prevents production of noise.

Depending on conditions of use, even if the disk-shaped portions of the spacers 42 are removed, since it is prevented that the end surfaces 46 and 47 of the intermediate disk collide directly with the surfaces 22 and 23 opposite to each other of the boss flanges, if the cylindrical leg portions 44 are buried so as to protrude from the surfaces 22 and 23 opposite to each other by a height corresponding to the thickness of plate t of the spacers 42, similar effects can be obtained.

Further, since a degree of freedom is given in the axial direction to the gaps between the end surfaces 47 and 48 of the intermediate disk and the surfaces 22 and 23 of the boss flanges, although it is very small, even if the rotating shafts 12 and 14 are supported with an angle $\Delta\theta$ by which the center lines of the shafts are deviated from each other with respect to those parallel to each other, the rotation transmitting function is not hindered and the angular deviation $\Delta\theta$ can be absorbed without producing noise. Therefore a great tolerance can be given to the construction and a machine, to which it is applied, can be mounted easily (refer to FIG. 3).

Further, when the length p of the liners is set so as to be equal to the sum of the width s of the intermediate disk 32 and a length corresponding to the plate thickness t of the spacer 42 so that they protrude forward and backward from the end surfaces of the intermediate disk 32 by the length equal to the plate thickness t, since the end surfaces 58 and 59 of the liners are brought at first into contact with the surfaces 22 and 23 opposite to each other of the boss flange, direct collision of the boss flanges with the intermediate disk between metals is avoided. Consequently it is possible to achieve transmission of rotation not influenced by the angular deviation $\Delta\theta$ of the center lines of the shafts owing to the gaps described above, producing no noise, without spacers 42 and drilled holes 46 specifically disposed. FIG. 3 indicates both the mode of realization, where the spacers 42 are mounted, and the mode of realization, where the length p of the liners is greater than the width s of the intermediate disk 32 so as to protrude therefrom.

Figure 7A:
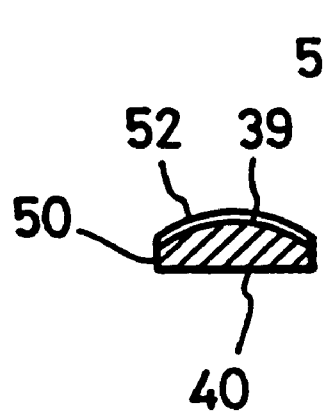
FIG. 7A is a cross-sectional view of a second embodiment of the liner in the eccentric shaft coupling according to the present invention.
Figure 7B:
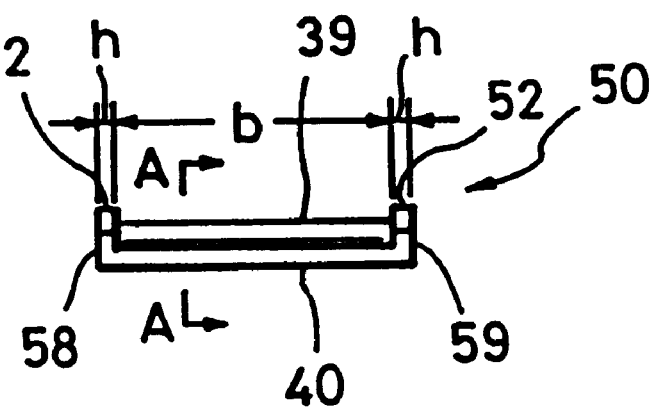
FIG. 7B is a front view thereof.

FIGS. 7A and 7B show a liner 50 according to a second embodiment, in which items corresponding to those in the liner 38 in the first embodiment are represented by same reference numerals. FIG. 7A is a cross-sectional view thereof along a line A—A in FIG. 7B and FIG. 7B is a side view thereof. Protruding edges 52 are formed at the two extremities of the liner 50 and the inner distance b between the protruding edges 52 is fitted to the width s of the intermediate disk 32. According to the present embodiment, a special die is required for forming it, but owing to these protruding edges movement of the liner 50 in the axial direction is restricted and in this way it is fixed surely.

Also in this second embodiment, owing to the fact that the width h of the protruding edges 52 is equal to the plate thickness t of the spacer 42, since the end surfaces 58 and 59 of the liner are brought into contact with the surfaces 22 and 23 opposite to each other of the boss flanges, direct collide thereof with the intermediate disk 32 between metals is prevented and in this way it is possible to obtain a similar effect, which is absorption of the angular deviation $\Delta\theta$ of the center lines of the shaft or reduction in noise production, without using any spacers.

Hereinbelow mounting operation of the eccentric shaft couplings in the first and the second embodiment of the present invention will be explained. The rotating shafts 12 and 13, which are inserted previously into the boss flanges 18 and 19, respectively, are supported rotatably by bearings (not indicated in the figures) in a predetermined positional relation. At this time, a deviation e of the center lines of the shafts and an angular deviation $\Delta\theta$ from the parallelism are tolerated in a predetermined extent. The distance between the surfaces opposite to each other of the extremities 16 and 17 of the shafts is held at a predetermined value g set previously in a state where displacement of the shafts in a thrust direction is restricted.

Then the intermediate disk 32 is inserted approximately perpendicularly to the center lines of the shafts from one side between the surfaces of the extremities 16 and 17 opposite to each other of the shafts by making them pass through an opening of one of the cylindrical cavities to be held so that the center hole 34 is positioned approximately at a gap between the extremities 16 and 17 opposite to each other of the shafts. Two liners 38 (50) are inserted into each of the cylindrical cavities 35 to be engaged with the inner wall 36 so that the plane portions 40 are parallel to the respective diametral line 24 or 25 (refer to FIG. 2) and thereafter they are provisionally stuck by using an appropriate adhesive.

The boss flanges 18 and 19, into which the rotating shafts 12 and 13 are inserted slidably, are slid so that the intermediate disk 32 is held therebetween from both the sides. The protrusions 28 and 29 are inserted into the rectilinear grooves 56 formed by the plane portions 40 of the liners in the respective cylindrical cavities 35 of the intermediate disk corresponding to the sliding surfaces 26 and 27 thereof in a positional relation where phases of the protrusions differ by 90° from each other.

The boss flanges 18 and 19 are fixed to the rotating shafts 12 and 14, respectively, by means of appropriate well-known means such as setting screws 20 and 21, leaving suitable gaps between the end surfaces 47 and 48 of the intermediate disk 32 and the surfaces 23 and 24 opposite to each other of the boss flanges 18 and 19, respectively. The deviation e between the center line of the first rotating shaft 12 and the center line of the second rotating shaft 14 is absorbed by a degree of freedom in two directions given by the rectilinear grooves 56 perpendicular to each other formed in the intermediate disk 32 and in this way smooth rotation similar to that obtained by means of an Oldham coupling can be secured.

Figure 8A:
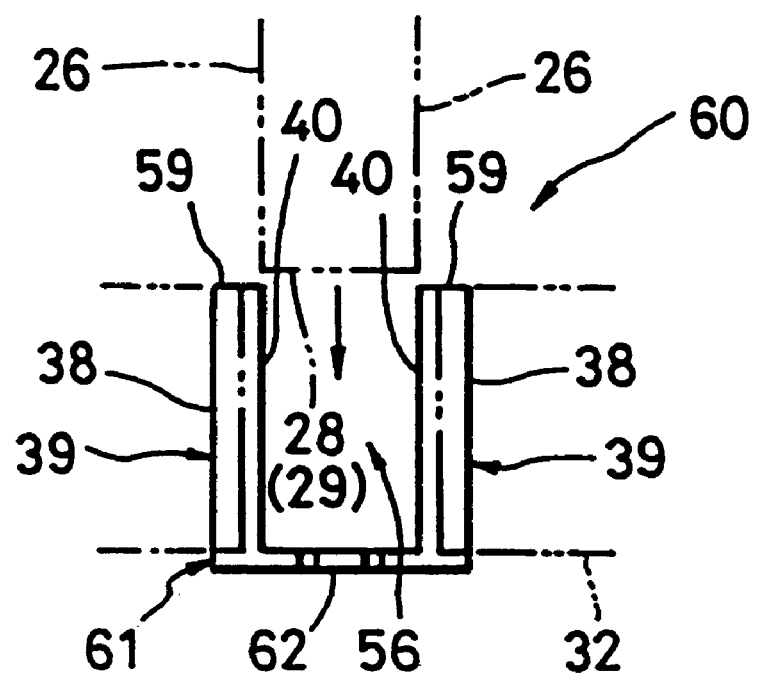
FIG. 8A is a side view showing a construction linking two liners in a third embodiment of the liner in the eccentric shaft coupling according to the present invention.
Figure 8B:
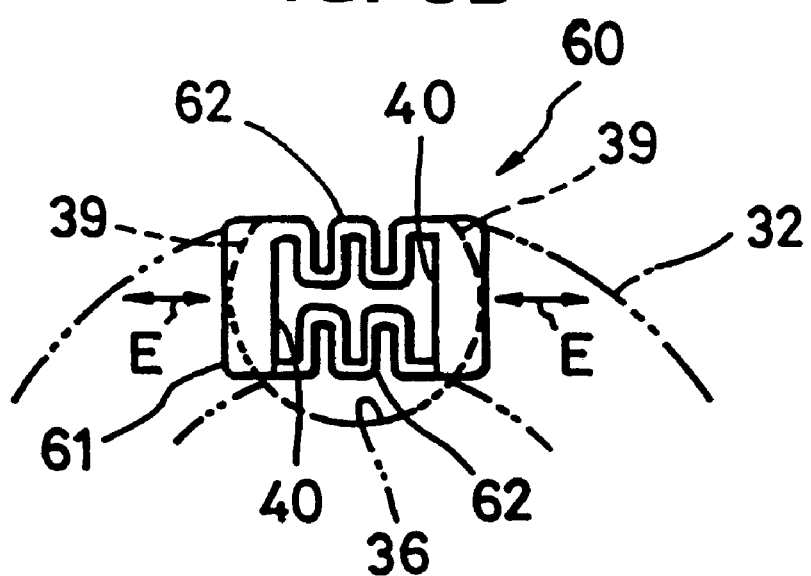
FIG. 8B is a plan view showing an elastic construction of a thin plate-shaped portion linking the two liners therein.
Figure 9:
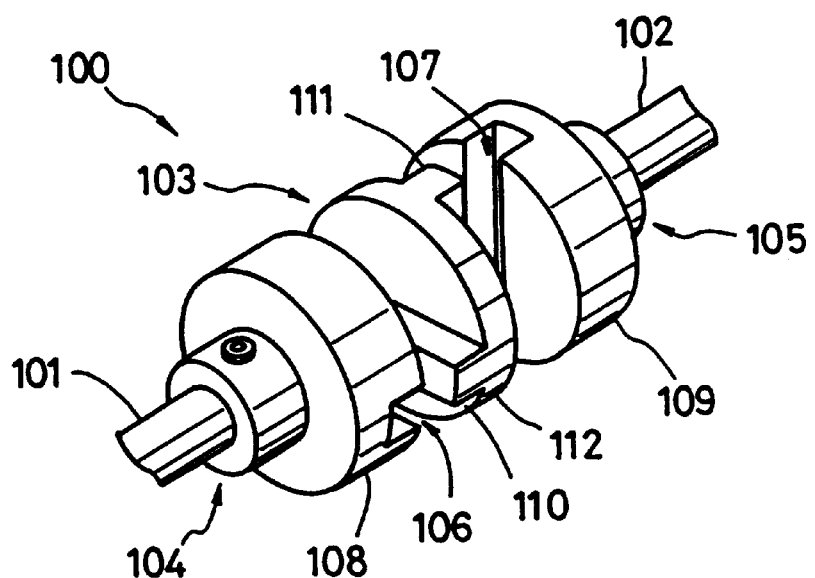
FIG. 9 is an exploded perspective view of a prior art typical Oldham coupling.
Figure 10:
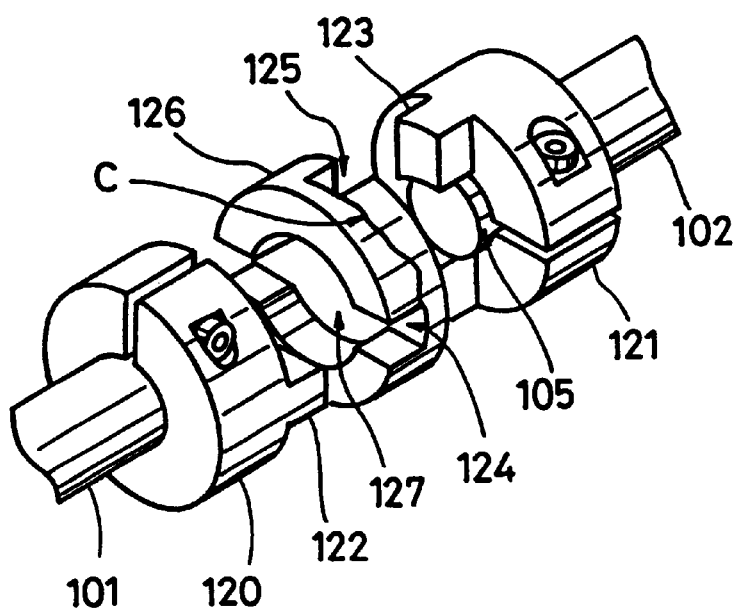
FIG. 10 is an exploded perspective view of a modified example of another prior art Oldham coupling.

FIGS. 8A and 8B show a composite liner 60 according to a third embodiment. As indicated by a side view in FIG. 8A, the two liners are linked in one body by bridging a pair of liners 38, which are inserted into each of the cylindrical cavities 35 in the intermediate disk 32 so that they are opposite to the inner wall 36, by means of a plate-shaped elastic body 61. In the figures items corresponding to those used in the first embodiment are represented by same reference numerals. The bodies 61 seat against the faces of disk 32. The bodies 61 thus provide the liners with a length greater than the depth of the associated cavities 35.

FIG. 8B is a plan view showing an elastic construction of the thin plate-shaped elastic body 61, in which the composite liner 60 is expansible in a direction indicated by an arrow E owing to two symmetrical wave-shaped bands 62. In this case, the wave-shaped bands 62 has a natural length is slightly greater than the distance between the constituent liners 38 of the composite liner 60. In this way, since the natural outer diameter of the arcuate surfaces 39 is slightly greater than the inner diameter of the cylindrical cavity 35, when the composite liner 60 is inserted into one of the cylindrical cavities 35 to be mounted there, the plate-shaped elastic body 61 is forced in the compression direction to shrink the two arcuate surfaces 39 of the composite liner 60 by pushing.

The composite liner 60 inserted into the cylindrical cavity 35 to be mounted there is thrust to the inner wall 36 by repulsive force of the wave-shaped bands 62 elastically compressed to be held stably in the cylindrical cavity 35. The plane portions 40 thereof define therefore automatically the rectilinear groove 56 having parallel surfaces with a predetermined distance. Consequently it is possible even for an unskilled worker to achieve, easy insertion of the protrusions 28 and 29 into the respective rectilinear grooves 56 without using any adhesive. Further the thin plate-shaped elastic body 61 linking the pair of liners 38 seat against the face surfaces of the intermediate disk 32. Thus, the bodies 61 function in the same way as the spacers 42, the spacers 42 and the drilled holes 46 can be omitted. Explanation is omitted, because the function of the eccentric shaft coupling using the composite liner 60 according to the third embodiment is thought to be identical to that explained for the first and the second embodiment.

As clearly seen in the above explanation, using the eccentric shaft coupling according to the present invention, for the intermediate disk it is sufficient to try to improve robustness thereof, independently from resistance to wear, owing to the fact that there are disposed liners subjected to strong wear separately from the main body of the intermediate disk. On the other hand, since the liners can be dealt as articles of consumption and it is possible to exchange partially only worn liners, the torque transmitting function under a high load can be managed while maintaining characteristics of an Oldham coupling mechanism capable of dealing with a large deviation of rotating shafts.

Further, resistances to heat and to corrosion can be given to it in order to deal with use at a high temperature or in a corrosive atmosphere. In addition, since it has a simple construction, which can be worked with an extremely high precision and on the other hand large tolerances in the mounting can be given thereto on the eccentricity and the parallelism, mounting of a machine to which it is applied is easy, load in production management is reduced, and thus satisfactory economical effects can be obtained. Further, if a pair of liners are linked in one body, mounting becomes easier and thus it is possible to shorten mounting time.

What is claimed is:

1. A shaft coupling for coupling two rotating shafts together, said coupling comprising:

two cylindrical boss flanges, each said flange being secured to the end of a separate one of the shafts and each said flange is formed with a face surface wherein the face surfaces of said flanges affront each other;

two pairs of protrusions, each pair of protrusions extending forward from the face surface of a separate one said flanges towards the face surface of the other said flange, each protrusion having parallel side surfaces and the protrusions forming each pair of protrusions are diametrically opposed to each other and are collectively shaped to have the same length and a common width that defines the distance between the side surfaces of said protrusions;

an intermediate disk disposed between said flanges, said intermediate disk being formed to have opposed face surfaces, each face surface of said intermediate disk being located adjacent the face surface of a separate one of said flanges, and four cylindrical cavities disposed around a peripheral section of said disk, wherein: a first pair of the cavities are diametrically opposed to each other relative to a center of said disk; a second pair of the cavities are diametrically opposed to each other relative to the center or said disk; the pairs of cavities are orthogonally oriented relative to each other; and said protrusions from one said flange are disposed in the first pair of cavities and said protrusions from the other said flange are disposed in the second pair of cavities;

a pair of spaced-apart liners are fitted in each cavity, each said liner having an arcuate surface and a planar surface opposite the arcuate surface, wherein the liners are located in the cavity so that the side surfaces of said protrusion disposed in the cavity are located between the planar surfaces of said liners; and spacers formed of synthetic resin mounted to the face surfaces of said flanges wherein, said spacers are positioned so that the face surfaces of the intermediate disk abut said spacers and do not abut the adjacent face surfaces of said flanges.

2. The shaft coupling according to claim 1, wherein said intermediate disk is made of a metal having a certain rigidity and said liners are made of a material having a high resistance to wear and a good lubricant property.

3. The shaft coupling according to claim 1, wherein said cylindrical boss flanges are sintered products made by powder metallurgy and further finished size is decided by high pressure press rectification type sizing.

4. The shaft coupling according to claim 2, wherein each pair of said liners are formed as a single unit wherein each pair of liners are linked by a thin plate-shaped portion at one edge of each liner and the liners have a length in the axial direction that is greater than a length of said intermediate disk in the axial direction.

5. The shaft coupling according to claim 4, wherein said thin plate-shaped portion of said pair of said liners has an elastic and expansible construction, which energizes said liners so as to increase the distance between said liners.

6. The shaft coupling according to claim 4, wherein each said pair of liners and said plate-shaped portion is made of a synthetic resin.

7. A shaft coupling for coupling two rotating shafts together, said coupling comprising:

two cylindrical boss flanges, each said flange being secured to the end of a separate one of the shafts and each said flange is formed with a face surface wherein, the face surfaces of said flanges affront each other;

two pairs of protrusions, each pair of protrusions extending forward from the face surface of a separate one said flanges towards the face surface of the other said flange, each said protrusion having parallel side surfaces and the protrusions forming each pair of protrusions are diametrically opposed to each other and are collectively shaped to have the same length and a common width that defines the distance between the side surfaces of said protrusions;

an intermediate disk disposed between said flanges, said intermediate disk being manufactured from metal and being formed to have opposed face surfaces, each face surface of said intermediate disk being located adjacent the face surface of a separate one of said flanges, and four cylindrical cavities disposed around a peripheral section of said disk, wherein: the cavities have a depth; a first pair of the cavities are diametrically opposed to each other relative to a center of said disk; a second pair of the cavities are diametrically opposed to each other relative to the center or said disk; the pairs of cavities are orthogonally oriented relative to each other; and said protrusions from one said flange are disposed in the first pair of cavities and said protrusions from the other said flange are disposed in the second pair of cavities; and a single-piece liner assembly fitted each cavity, each said liner assembly having: two spaced apart liners, each liner having an arcuate surface and a planar surface opposite the arcuate surface and opposed ends, wherein the planar surfaces of said liners are opposite each other and the liners have a length greater then the depth of the cavity; and a plate-shaped member that extends between said liners at one pair of ends of said liners and wherein said liner assembly is made of material having a high resistance to wear and a good lubricating property and said liners are located in the cavity so that the side surfaces of the protrusion disposed in the cavity are located between the planar surfaces of said liners.

8. The shaft coupling of claim 7, wherein said cylindrical boss flanges are sintered products made by powder metallurgy and further finished size is formed by high pressure press rectification type sizing.

9. The shaft coupling of claim 7, wherein said plate-shaped members of said liner assemblies have elastic and expansible construction which energizes said liners so as to urge said liners apart.

10. The shaft coupling according to claim 7, wherein said liner assemblies are made from a synthetic resin.

* * * * *